Nov. 7, 1967  E. K. KOPPELMANN  3,350,762
ROLLER BURNISHING TOOL
Filed Sept. 10, 1965

INVENTOR.
ELDO K. KOPPELMANN
BY
*Barlow & Barlow*
ATTORNEYS

3,350,762
ROLLER BURNISHING TOOL
Eldo K. Koppelmann, Cumberland, R.I., assignor to Madison Industries, Inc., a corporation of Rhode Island
Filed Sept. 10, 1965, Ser. No. 486,391
4 Claims. (Cl. 29—90)

This invention provides a tool for burnishing an exterior cylindrical surface on the principle set forth fully in my Patent No. 2,843,918, dated July 22, 1958. In this patent, generally frusto-conical rollers act between the workpiece and a frusto-conical surface of a mandrel as the rollers move in a planetary path to compact and reduce the surface diameter of the workpiece.

One of the objects of the invention is to provide a burnishing tool which will accomplish the results of the burnishing tool of the above mentioned patent but which tool is constructed of a fewer number of parts and, therefore, one which is of a simpler assembly.

Another object of this invention is to provide a tool which may be more quickly and easily assembled and thus one which will be less expensive to produce.

The invention centers around a simpler means of coupling the size adjusting micrometer nut to the roller containing cage for sizing of the burnishing operation performed by the tool.

With these and other objects in view, the invention consists of certain novel features of construction as will be more fully described and particularly pointed out in the appended claims.

Figure 1:
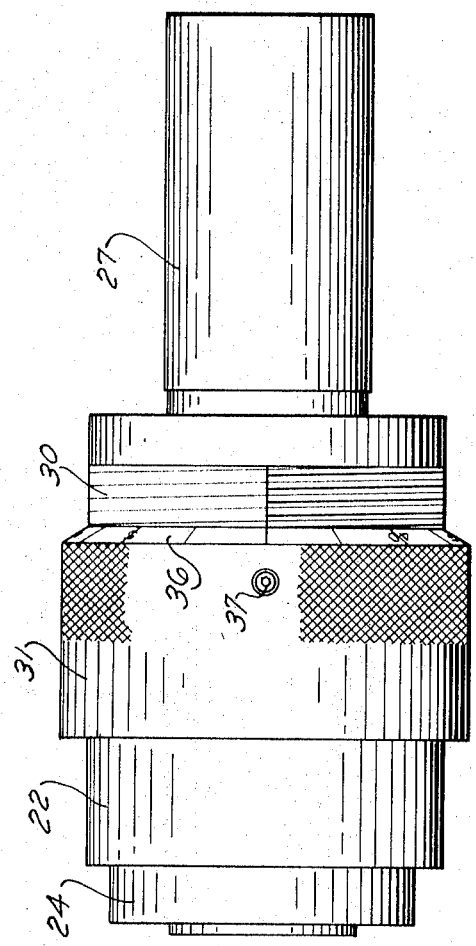
Figure 2:
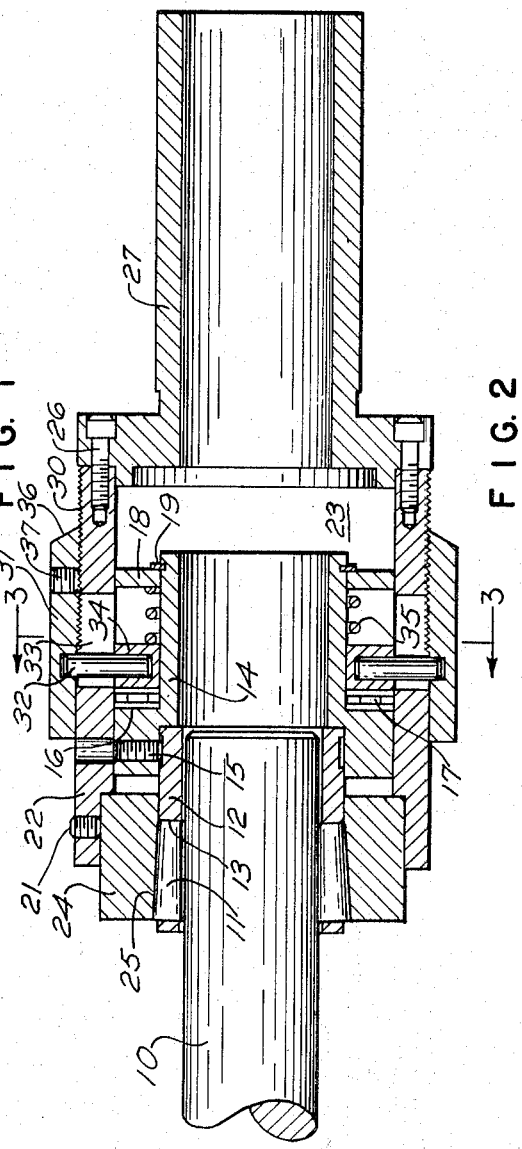
Figure 3:
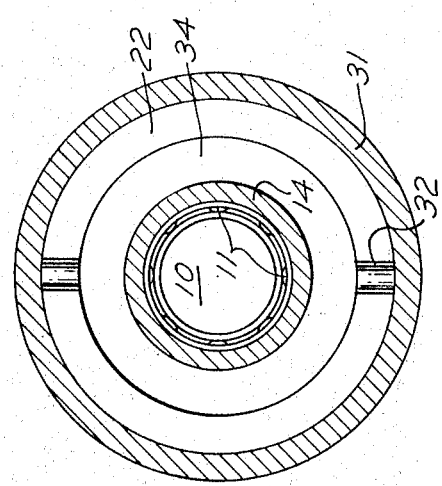

In the accompanying drawings:
FIG. 1 is an exterior elevational view of the burnishing tool of this invention;
FIG. 2 is a diametrical section illustrating a workpiece engaged by the tool; and
FIG. 3 is a section on substantially line 3—3 of FIG. 2.

In the drawings, 10 designates generally a cylindrical workpiece which is engaged by a plurality of frusto-conical rollers 11 held in a cage 12 by means of slots 13 which extend axially of the cage and in spaced relation about the cage. This cage is provided with a sleeve 14 which acts as an extension from the cage and which is held in fixed relation to the cage by a set screw 15. This sleeve provides a shoulder 16 which engages a thrust bearing 17 which encircles the sleeve. An annular radial abutment 18 is provided at the end of the sleeve held in place by a spring ring 19.

A mandrel 22 has a hollow interior 23 which receives the cage and sleeve above mentioned and is provided with a removable portion 24 held in position by set screw 21 having a frusto-conical inner surface 25 to engage the frusto-conical rollers 11 of the cage and confine them and urge them toward the workpiece 10 as rotation occurs. The mandrel is provided with a shank or reduced portion 27 which serves as a means for driving the tool and which may be fixed to the larger portion of the mandrel by screws 26.

The mandrel is threaded on its outer surface as at 30 and is engaged by a micrometer nut 31 which has a plurality of pins 32 extending radially inwardly from the nut through slots 33 in the mandrel 22, which pins extend into a collar 34 to prevent relative rotary movement. This collar engages the thrust bearing 17 on the opposite side of which is the shoulder 16 of the cage sleeve. A spring 35 acts between the collar 34 and the abutment 18 on the cage sleeve tending to move the cage and its sleeve, as a unit, and the mandrel in opposite directions toward the thrust bearing. The movement of the micrometer nut 31 along the mandrel effectively moves the position of the cage with reference to the tapered surface 25 of the mandrel and thus controls the size reduction which may be accomplished on the workpiece. Indicia 36 on the nut serves to indicate the position of the nut on the mandrel so that the limiting size may be indicated. A set screw 37 serves to retain the nut 31 in adjusted position.

The rearward surface of the slots 13 in the cage serves as abutments against which the rear surfaces of the rollers 11 bear during the burnishing operation with the tendency of the mandrel to overtake the rollers being converted into a continuous pushing operation on the rollers themselves which keeps them abreast of the mandrel after the operating position has been established. This arrangement of necessity results in some degree of slippage between the rollers and the mandrel. The geometrical configuration would naturally cause a tendency for the rollers to engage the mandrel along a relatively helical path, but the limitation imposed by the position of the cage generates a continuous planetary relationship. When the end of the burnishing operation has been achieved, the natural tendency of the sleeve to feed itself along the work 10 can be limited by the engagement of the machine with a suitable stop (not shown). As a result of the succession of the relative axial movement, the natural tendency of the rollers 11 to continue along their helical path on the workpiece 10 results in a progressive movement of the rollers to the left as shown in FIG. 2 toward the major diameter of the frusto-conical surface 25 of the mandrel. Such movement tends to increase the diameter which confines the rollers, and correspondingly results in a decrease in pressure. This action continues until the burnishing pressure has been substantially released, or at least enough so to permit the withdrawal of the workpiece from the tool. The onward movement of the cage 12 accompanying the release of the rollers results in the movement of the shoulder 16 away from the thrust bearing 17 accompanied by the compression of the spring 35 which is confined between the collar 34 and the abutment 18.

It will be seen that there is provided a simple yet effective arrangement of parts in the burnishing tool in which a path of forces acting therein during burnishing starts with the axial force at rollers 11 that is transmitted through cage 12, sleeve 14, to bearing 17, thence through collar 34, pins 32, nut 31, and mandrel parts 22, 24.

I claim:
1. A burnishing tool comprising:
   (a) a thrust bearing,
   (b) cage means equipped with tapered rollers engaging one side of said bearing;
   (c) mandrel means having a tapered surface to engage said rolls with a collar engaging the other side of said bearing;
   (d) a micrometer ring threadedly embracing said mandrel means and connected to said collar by a plurality of radially disposed slots and pins through said mandrel means which act as a key to prevent relative rotative movement while permitting relative axial movement of said collar and mandrel;
   (e) and resilient means urging said cage means and mandrel means in opposite directions toward said bearing.
2. A burnishing tool as in claim 1 wherein said slots are in the mandrel and said pins are fixed in said nut and collar.
3. A burnishing tool as in claim 1 wherein said collar embraces said cage sleeve.
4. A burnishing tool as in claim 1 wherein said resilient means is a helical spring embracing said sleeve and acts between said collar and an abutment on said sleeve to urge the cage and mandrel in opposite directions.

No references cited.

RICHARD H. EANES, JR., *Primary Examiner.*